(12) United States Patent
M T et al.

(10) Patent No.: US 11,595,200 B2
(45) Date of Patent: Feb. 28, 2023

(54) QUANTUM KEY DISTRIBUTION SYSTEM AND METHOD FOR SECURELY DISTRIBUTING QUANTUM KEYS IN A NETWORK

(71) Applicant: QuNu Labs Private Ltd, Bengaluru (IN)

(72) Inventors: Karunakaran M T, Bengaluru (IN); Anindita Banerjee, Bengaluru (IN); Rajesh Kumar Krishnan, Bengaluru (IN)

(73) Assignee: QuNu Labs Private Ltd

( * ) Notice: Subject to any disclaimer, the term of this patent is extended or adjusted under 35 U.S.C. 154(b) by 96 days.

(21) Appl. No.: 17/391,084

(22) Filed: Aug. 2, 2021

(65) Prior Publication Data

US 2023/0034274 A1  Feb. 2, 2023

(51) Int. Cl.
*H04L 9/08* (2006.01)
*H04L 9/32* (2006.01)

(52) U.S. Cl.
CPC .......... *H04L 9/0858* (2013.01); *H04L 9/0872* (2013.01); *H04L 9/3226* (2013.01)

(58) Field of Classification Search
CPC .... H04L 9/0858; H04L 9/0872; H04L 9/3226
See application file for complete search history.

(56) References Cited

U.S. PATENT DOCUMENTS

| | | | |
|---|---|---|---|
| 9,294,272 B2 | 3/2016 | Lütkenhaus et al. | |
| 11,418,330 B2 * | 8/2022 | Bucklew | H04L 9/12 |
| 2004/0184603 A1 | 9/2004 | Pearson et al. | |
| 2006/0062392 A1 | 3/2006 | Lee et al. | |
| 2010/0299526 A1 | 11/2010 | Wiseman et al. | |
| 2014/0016779 A1 * | 1/2014 | Lirakis | G06N 10/00 380/256 |
| 2017/0054556 A1 * | 2/2017 | Fu | H04W 12/06 |
| 2017/0279540 A1 * | 9/2017 | Tanizawa | H04B 10/70 |
| 2021/0152347 A1 * | 5/2021 | Cambou | H04B 10/70 |
| 2022/0269974 A1 * | 8/2022 | Bhaskar | G06N 10/00 |

OTHER PUBLICATIONS

Yongli Zhao, Yuan Cao, Xiaosong Yu and Jie Zhang; Quantum Key Distribution (QKD) over Software-Defined Optical Networks; Nov. 5, 2018; https://www.intechopen.com/chapters/63116.

* cited by examiner

*Primary Examiner* — Matthew Smithers
(74) *Attorney, Agent, or Firm* — Jason C. Cameron

(57) ABSTRACT

A system and method for securely distributing quantum keys in a network are disclosed. The method includes receiving request for generating pair of quantum keys between source quantum node and target quantum node. Further, the method includes generating first pair of quantum keys based on the request. The method includes transmitting the first pair of quantum keys to the intermediate quantum node using a first quantum link. The method further includes generating intermediate pair of quantum key based on events detected at the intermediate quantum node. The method further includes interleaving the intermediate pair of quantum key with the first pair of quantum keys. Also, the method includes generating a second pair of quantum keys comprising interleaved intermediate pair of quantum key and first pair of quantum keys. Further, the method includes encoding and transmitting the second pair of quantum keys to target quantum node using second quantum link.

18 Claims, 3 Drawing Sheets

QUANTUM KEY DISTRIBUTION SYSTEM AND METHOD FOR SECURELY DISTRIBUTING QUANTUM KEYS IN A NETWORK

FIELD OF INVENTION

Embodiments of a present disclosure relate to communication systems and more particularly to a quantum key distribution system for securely distributing quantum keys in a network.

BACKGROUND

Quantum key distribution (QKD) is a well-known technique which offers the possibility of secure key distribution. QKD relies on fundamental quantum properties and allows two parties, commonly referred to as Alice and Bob, to exchange a value and know that an eavesdropper, usually referred to as Eve, has not learnt much about the value. QKD allows key material to be securely derived by Alice and Bob as needed, which offers significant advantages over other methods of key distribution. QKD as described however requires an uninterrupted optical path from Alice to Bob to act as a quantum channel. This may be in free space or through an optical waveguide such as a fibre optic cable. In either case distances are limited, not least due to the use of single photons. Further in a network having a large number of connected users, it will be impractical for each user to have a direct optical link with each other user.

One way of overcoming this limitation would be to have a network of nodes. In this way, a message passing along the chain is encrypted between the nodes, though a different key is used on each link. These nodes, commonly referred as "trusted nodes", perform key hopping, whereby keys are generated at a starting node and transferred securely from node to node until the end node. The end-result is that QKD can utilize an authenticated communication channel and transform it into a secure communication channel. In theory, QKD should be combined with One-Time Pad (OTP) encryption to achieve provable security. However, an OTP requires keys, which are as long as the data to be encrypted and can be used only once.

Hence, there is a need for an improved quantum key distribution system and method for distributing quantum keys in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a system for securely distributing quantum keys in a network is disclosed. The system includes a source quantum node and an intermediate quantum node. The source quantum node comprises a receiver configured for receiving a request for generating pair of quantum keys between the source quantum node and a target quantum node in a network. The source quantum node and the target quantum node is connected via one or more intermediate quantum nodes. The source quantum node is further comprises a source quantum key generator subsystem for generating a first pair of quantum keys distributable between the source quantum node and the intermediate quantum node based on the request. Further, the source quantum node comprises a transmitter configured for transmitting the generated first pair of quantum keys to the intermediate quantum node using a first quantum link between the source quantum node and the intermediate quantum node.

The intermediate quantum node comprises an intermediate quantum key generator subsystem configured for generating an intermediate pair of quantum key distributable between the intermediate quantum node and the target quantum node based on one or more events detected at the intermediate quantum node. Further, the intermediate quantum node comprises an interleave subsystem configured for interleaving the generated intermediate pair of quantum key with the first pair of quantum keys at appropriate time locations. Furthermore, the intermediate quantum node comprises a second quantum key generator subsystem configured for generating a second pair of quantum keys comprising the interleaved intermediate pair of quantum key and the first pair of quantum keys. The part of the generated second pair of quantum keys distributable between the intermediate quantum node and the target quantum node is identical to a part of the first pair of quantum keys distributed between the source quantum node and the intermediate quantum node. Furthermore, the intermediate quantum node comprises an encoding subsystem and a transmitter configured for encoding and transmitting the generated second pair of quantum keys to the target quantum node using a second quantum link between the intermediate quantum node and the target quantum node.

In accordance with another embodiment of the present disclosure, a method for securely distributing quantum keys in a network is disclosed. The method includes receiving a request for generating shared pair of quantum keys between the source quantum node and a target quantum node in a network. The source quantum node and the target quantum node is connected via one or more intermediate quantum nodes. Further, the method includes generating a first pair of quantum keys distributable between the source quantum node and the intermediate quantum node based on the request. Furthermore, the method includes transmitting the generated first pair of quantum keys to the intermediate quantum node using a first quantum link between the source quantum node and the intermediate quantum node. The method further includes generating an intermediate pair of quantum key distributable between the intermediate quantum node and the target quantum node based on one or more events detected at the intermediate quantum node. The method further includes interleaving the generated intermediate pair of quantum key with the first pair of quantum keys at appropriate time locations. Also, the method includes generating a second pair of quantum keys comprising the interleaved intermediate pair of quantum key and the first pair of quantum keys. The part of the generated second pair of quantum keys distributable between the intermediate quantum node and the target quantum node is identical to a part of the first pair of quantum keys distributed between the source quantum node and the intermediate quantum node. Further, the method includes encoding and transmitting the generated second pair of quantum keys to the target quantum node using a second quantum link between the intermediate quantum node and the target quantum node. Each node in the network comprises at least one apparatus capable of transmitting and/or receiving a quantum signal via the quantum link. The source quantum node and target quantum node are not directly connected via a single quantum link.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
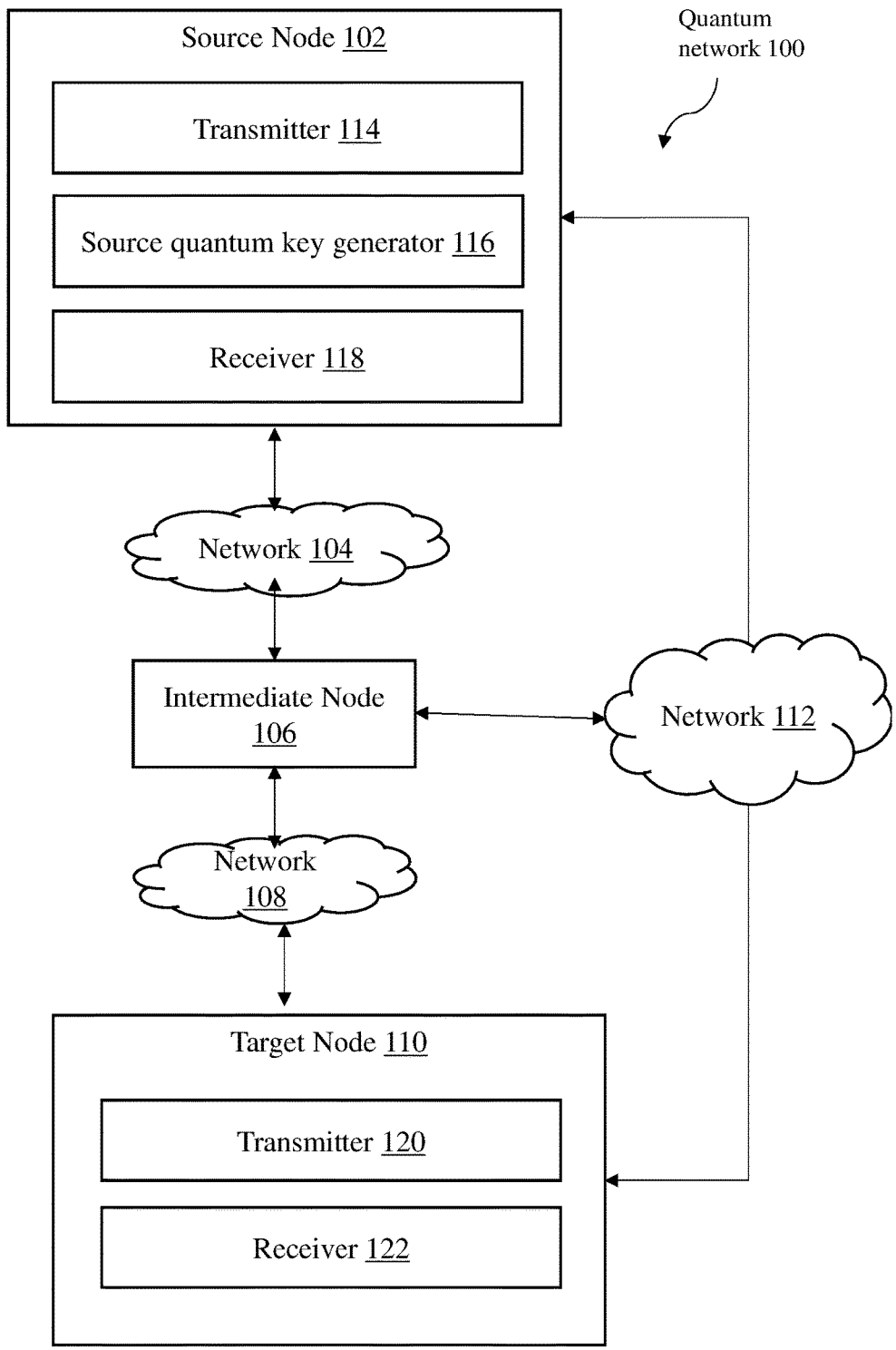
FIG. 1 is a block diagram illustrating an exemplary quantum network capable of securely distributing quantum keys in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "subsystem" that is configured and operated to perform certain operations. In one embodiment, the "subsystem" may be implemented mechanically or electronically, so a subsystem may comprise dedicated circuitry or logic that is permanently configured (within a special-purpose processor) to perform certain operations. In another embodiment, a "subsystem" may also comprise programmable logic or circuitry (as encompassed within a general-purpose processor or other programmable processor) that is temporarily configured by software to perform certain operations.

Accordingly, the term "subsystem" should be understood to encompass a tangible entity, be that an entity that is physically constructed permanently configured (hardwired) or temporarily configured (programmed) to operate in a certain manner and/or to perform certain operations described herein.

Embodiments of the present invention provide a system and method for quantum key distribution across multi-node quantum network. The present invention discloses three nodes, namely source quantum node, intermediate quantum node, and a target quantum node. The source quantum node is connected to the intermediate quantum node by a direct fibre (first quantum channel), and the intermediate quantum node is connected to the target quantum node by a direct fibre, a second quantum channel There is no direct fibre or quantum channel between the source quantum node and the target quantum node. Also, there exists a standard classical (Internet Protocol) IP communication channel between the each of the nodes. The present method enables generation of identical keys across multiple nodes, and at the same time conforms to the quantum key distribution (QKD) principles. Unlike the conventional systems, where a shared key between source quantum node and intermediate quantum node is transmitted to the target quantum node over the standard classical IP network using classical encryption algorithm such as (one time password) OTP, in the present invention, the shared key (for example 'C') between the source quantum node and the intermediate quantum node, is made available at the target quantum node using the principles of quantum physics exactly identical to the one which is implemented between the source quantum node and the intermediate quantum node. The key hence does not traverse the IP network at all. This method is absolutely and totally compliant to quantum principles.

Figure 2:
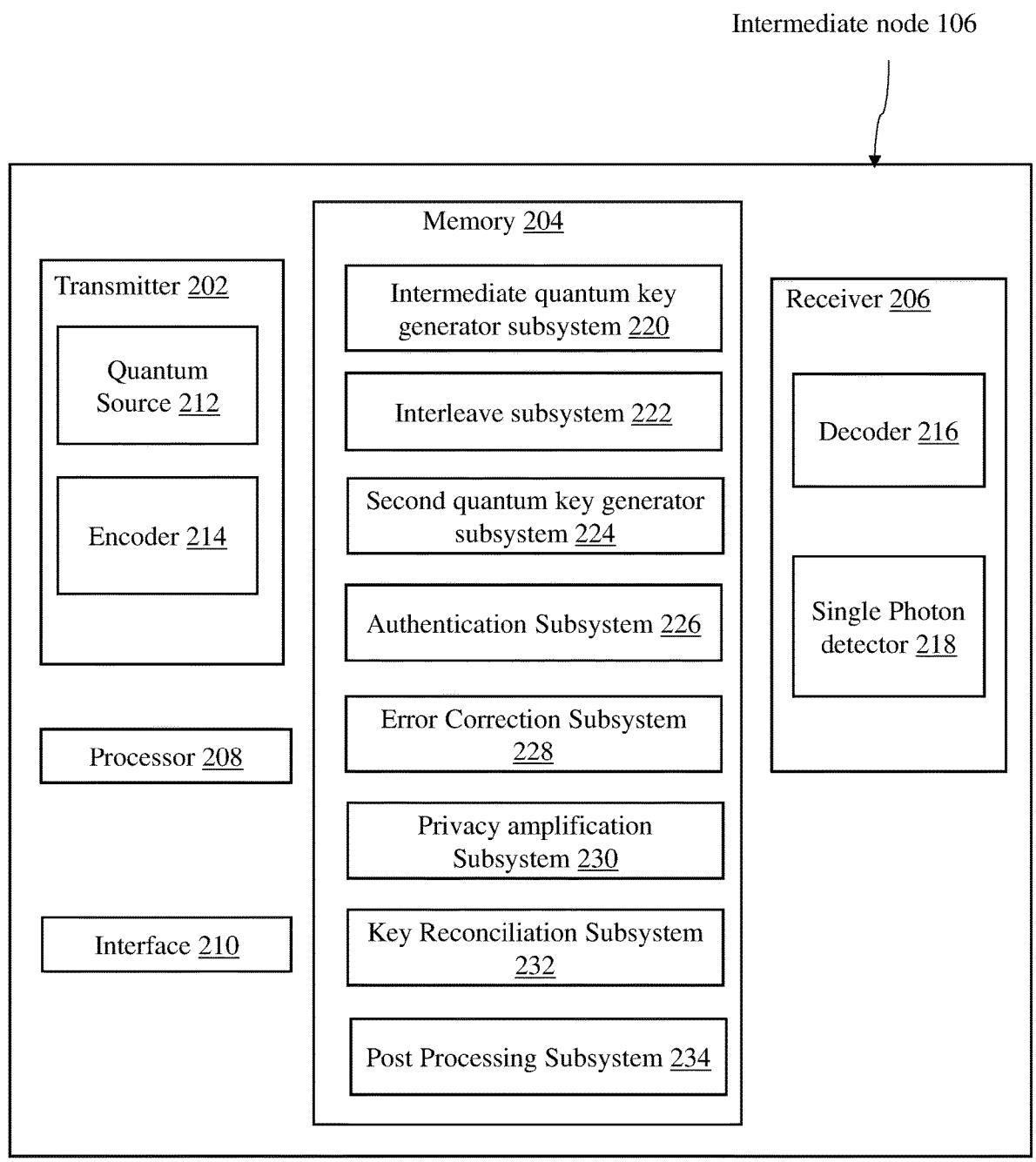
FIG. 2 is a block diagram illustrating an exemplary quantum key distribution system, such as an intermediate quantum node as shown in FIG. 1, for securely distributing quantum keys in accordance with an embodiment of the present disclosure.
Figure 3:
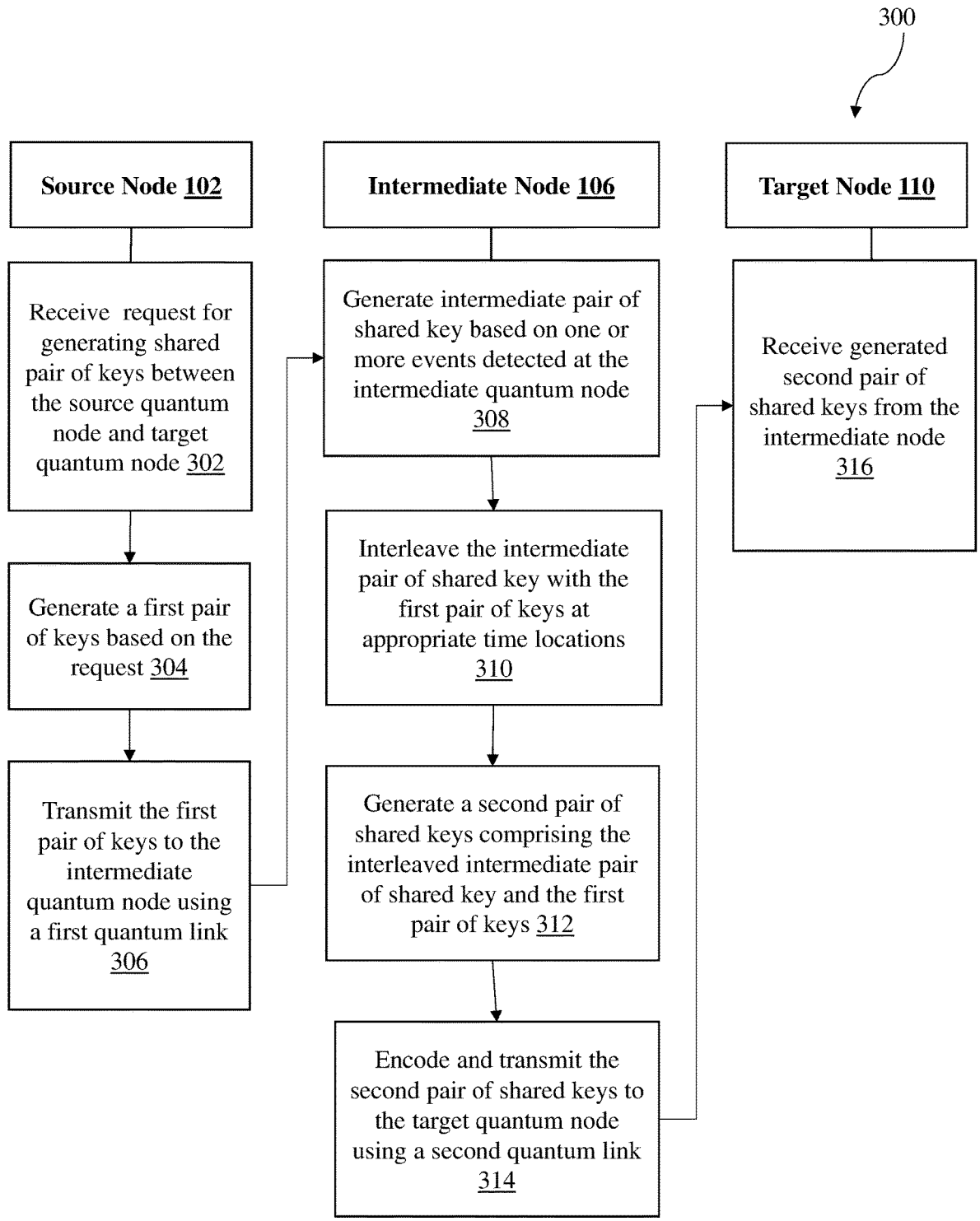
FIG. 3 is a flow diagram illustrating an exemplary method for securely distributing quantum keys in accordance with an embodiment of the present disclosure.

Referring now to the drawings, and more particularly to FIG. 1 through 3, where similar reference characters denote corresponding features consistently throughout the figures, there are shown preferred embodiments and these embodiments are described in the context of the following exemplary system and/or method.

FIG. 1 is a block diagram illustrating an exemplary quantum network 100 capable of securely distributing quantum keys in accordance with an embodiment of the present disclosure. The quantum network 100 comprises a source quantum node 102 connected to an intermediate quantum node 106 via a first quantum channel 104. The intermediate quantum node 106 is further connected to a target quantum node 110 via a second quantum channel 108. Additionally, the source quantum node 102 is connected to each of the intermediate quantum node 106 and the target quantum node 110 via a classic communication channel 112. Therefore, the source quantum node 102 and the intermediate quantum node 106 is connected via two channels, one is the first quantum channel 104 and the second one is the classic communication channel 112. Similarly, the intermediate quantum node 106 is connected to the source quantum node 102 via the first quantum channel 104 and the classic communication channel 112 and also connected to the target quantum node 110 via the second quantum channel 108 and the classic communication channel 112. In an embodiment, the source quantum node 102 and the target quantum node 110 are not directly connected via a quantum link. The source quantum node 102 and the target quantum node 110 are connected via the intermediate quantum node 106 through the first quantum channel 104 and the second quantum channel 108. Also, the source quantum node 102 and the target quantum node 110 are connected via the classic communication channel 112. The source quantum node 102, the intermediate quantum node 106 and the target quantum node 110 are the quantum key distribution systems. Although, in FIG. 1, the source quantum node 102 and the target quantum node 110 are connected one intermediate quantum node 106, a person skilled in the art may envision that the source quantum node 102 and the target quantum node 110 may be connected to more than one intermediate quantum nodes.

The quantum network 100 may be any known network type. The quantum network 100 may be comprised by an arrangement of free space transmitters and receivers forming a free space network. In an embodiment, the quantum network 100 may also comprise waveguide links between the nodes, for instance fibre optic. The quantum network 100 may be implemented purely for QKD purposes, i.e., the quantum network 100 may be a backbone carrying QKD signals only, to establish quantum keys between nodes that can then be used to encrypt conventional communications between the nodes sent via some other medium, for instance via another network—a wired electrical, wireless, or separate quantum network 100 for example.

The classic channel 112 may be wired or wireless network, and the quantum channels 104 and 106 can be a fibre channel, a quantum channel in free space, and the like. The classic channel 112 may be a direct point-to-point physical connection between two nodes or can be a logic connection established by connecting the two nodes to a classic network. The quantum channels 104 and 108 are optical networks which may be any known type of optical network allowing exchange of suitable quantum signals.

In an embodiment, the source quantum node 102 comprises a transmitter 114, a source quantum key generator 116 and a receiver 118. The receiver 118 is configured for receiving a request for generating pair of quantum keys between the source quantum node 102 and a target quantum node 110 in the network 100. The source quantum node 102 and the target quantum node 110 is connected via one or more intermediate quantum nodes 106. The request comprises communication address of one or more intermediate quantum nodes 106 and the target quantum node 110, a communication path to be used in exchanging the quantum keys, communication channel information and the like. A quantum key is a random bit string. The source quantum key generator subsystem 116 is configured for generating a first pair of quantum keys distributable between the source quantum node 102 and the intermediate quantum node 106 based on the request. The transmitter 114 is configured for transmitting the generated first pair of quantum keys to the intermediate quantum node 106 using a first quantum link 104 between the source quantum node 102 and the intermediate quantum node 106. The transmission may occur using any known quantum key distribution scheme. In an embodiment, the transmitter 114 is also configured for sending valid time stamp data to the target quantum node 110 based on time stamp data received from the intermediate quantum node 106.

In generating the first pair of quantum keys, the source quantum key generator subsystem 116 is configured for determining a key transmission path from the source quantum node to the target quantum node based on one or more parameters. The key transmission path comprises the source quantum node 102 as the start node, the target quantum node 110 as the destination node and one or more intermediate quantum nodes 106 connected to the source quantum node 102 and the target quantum node 110 via one or more quantum links 104 and 108. The one or more parameters comprises distance between the source quantum node 102 and the target quantum node 110, the communication speed, load on the intermediate quantum nodes 106 and the like. Further, the source quantum key generator subsystem 116 is configured for authenticating the one or more intermediate quantum nodes 106 and the target quantum node 110 comprised in the determined key transmission path using a first authentication key. The first authentication key comprises a random bit string comprising a unique sequence of binary signals indicating the identity of the recipient node.

Further, the source quantum key generator subsystem 116 is configured for generating the first pair of quantum keys distributable between the source quantum node 102 and the intermediate quantum node 106 based on successful authentication. For example, the first pair of quantum keys may be "A+C", corresponding to qubit $QRNG_{12}$. The components of the intermediate quantum node 106 is described in more detail in FIG. 2.

The target quantum node 110 comprises a transmitter 120 and a receiver 122. The transmitter 120 is configured for sending an acknowledgement message on receipt of the second pair of quantum keys to the source quantum node 102 via an internet 112 and to the intermediate quantum node 106 via the second quantum link 108. The acknowledgement message comprises respective timestamp data. The receiver 122 is configured for receiving the second pair of quantum keys from the intermediate quantum node 106.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a quantum key distribution system as is unique to the present disclosure or necessary for an understanding of the present disclosure is depicted and described. The remainder of the construction and operation of the quantum key distribution system may conform to any of the various current implementation and practices known in the art.

FIG. 2 is a block diagram illustrating an exemplary quantum key distribution system, such as the intermediate quantum node 106 as shown in FIG. 1, for securely distributing quantum keys in accordance with an embodiment of the present disclosure. The intermediate quantum node 106 comprises a transmitter 202, a memory 204, a receiver 206, a processor 208 and an interface 210.

The transmitter 202 comprises a quantum source 212 and an encoder 214. The quantum source 212 emits pairs of photons in a desired entangled state. The photon pairs exhibit strong correlations in time, and entanglement in the degree of freedom in which the quantum information is encoded. The single photons comprising each of these entangled pairs are sent to other nodes in the quantum network 100 via free-space communication links (such as quantum links 104 and 108).

The encoder 214 is configured for encoding the generated second pair of quantum keys to the target quantum node 110. In an exemplary embodiment, a polarization state of photons are used to encode key bits.

The memory 204 and the processor 208 may be communicatively coupled by a system bus or a similar mechanism.

The processor(s) 208, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 208 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processor(s) 208, such as being a computer-readable storage medium. The processor(s) 208 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes a plurality of subsystems stored in the form of machine-readable instructions on any of the above-mentioned storage media and may be in communication with and executed by the processor(s) 208.

The memory 204 includes a plurality of subsystems in the form of programmable instructions executable by the one or more hardware processors 208. The plurality of subsystems includes an an intermediate quantum key generator subsystem 220, an interleave subsystem 222, a second quantum key generator subsystem 224, an encoding subsystem 226, an authentication subsystem 228, an error correction subsystem 230, a privacy amplification subsystem 232, a key reconciliation subsystem 234, and a post processing subsystem 236.

The intermediate quantum key generator subsystem 220 is configured for generating an intermediate pair of quantum key distributable between the intermediate quantum node 106 and the target quantum node 110 based on one or more events detected at the intermediate quantum node 106. The one or more events may be defined in terms of a bit value, a quantum basis, and transmission or detection interval. In an optical quantum implementation, quantum bases are defined in terms of polarization bases. These events are transmitted as quantum states over a quantum communication channel 104 during corresponding transmission intervals, and the intermediate quantum node 106 detects events of the quantum channel 104 based on random quantum detection bases. For example, the intermediate pair of quantum keys are "D", corresponding to qubit "$QRNG_{2local}$".

In an embodiment, the intermediate quantum node 106 sends time stamp data to the source quantum node 102 upon receiving the first pair of quantum keys.

Specifically, the intermediate quantum key generator subsystem 220 is configured for authenticating the target quantum node using a second authentication key upon detecting one or more events at the intermediate quantum node. The authentication key may be a relatively long random sequence, which may be used directly during an authentication session, or it may be indexed, and a given segment may be used to seed a pseudo random number generator (PRNG) to generate an authentication key for a given session. The authentication is performed to establish secure link with the specific node. Further, the intermediate quantum key generator subsystem 220 is configured for determining a first quantum bit error rate associated with transmission of the intermediate pair of quantum key via the second quantum link upon successful authentication of the target quantum node. This first quantum bit error rate is used to determine if the session is secure. If the session is secure, an appropriate number of photons are selected as the bits of the shared key that both the transmitter and receiver uses. In an embodiment, error in the sifted key is known as the quantum bit error rate (QBER) and if it is below a certain threshold, source quantum node 102 and the intermediate quantum node 106 considers the key to be secured or and else, the protocol is aborted.

Further, the intermediate quantum key generator subsystem 220 is configured for generating the intermediate pair of quantum key distributable between the intermediate quantum node and the target quantum node based on the determined quantum bit error rate.

The interleave subsystem 222 is configured for interleaving the generated intermediate pair of quantum key with the first pair of quantum keys at appropriate time locations. The process of interleaving may be performed on random basis. For example, the key "A+C" is interleaved with the key "D" at appropriate time locations. That is, the $QRNG_{12}$ is interleaved with $QRNG_{2local}$. Specifically, the interleave subsystem 222 is configured for determining quantum states of the intermediate pair of quantum key and the first pair of quantum key by parsing the intermediate pair of quantum key and the first pair of quantum keys. Each photon has a random quantum state, and collectively all the photons create a bit stream of ones and zeros. When the photons arrive at the receiver 206, the receiver 206 uses beam splitters (horizontal/vertical and diagonal) to "read" the polarization of each photon. The receiver 206 does not know which beam splitter to use for each photon and requires to guess which one to use. After the receiver 206 informs the transmitter 114 of the source quantum node 102 which beam splitter was used for each of the photons in the sequence they were sent, the transmitter 114 then compares that information with the sequence of polarizers used to transmits the photons. The photons that were read using the wrong beam splitter are discarded, and the resulting sequence of bits becomes a unique optical key that is used to encrypt data.

Further, the interleave subsystem 222 is configured for determining time locations in a string of quantum signal for each of the intermediate pair of quantum key and the first pair of quantum key. Furthermore, the interleave subsystem 222 is configured for interleaving randomly, the generated intermediate pair of quantum key and the first pair of quantum keys at determined time locations based on the determined quantum states.

The second quantum key generator subsystem 224 is configured for generating a second pair of quantum keys comprising the interleaved intermediate pair of quantum key and the first pair of quantum keys. The second pair of quantum keys is "A+C+D", corresponding to qubit $QRNG_2$. A part of the generated second pair of quantum keys distributable between the intermediate quantum node and the target quantum node is identical to a part of the first pair of quantum keys distributed between the source quantum node and the intermediate quantum node. For example, the quantum key generated between the source quantum node 102 and the intermediate quantum node 106 contains "A+C". The quantum key generated between the intermediate quantum node 106 and the target quantum node 110 contains "C+D". The component 'C' is common to all three nodes. In this method, the common key part 'C' is made available at the target quantum node 110 which originated at the source quantum node 102 without requiring transmission over the standard IP channel network 112, but rather through the quantum channels 104 and 108.

Specifically, the second quantum key generator subsystem 224 is configured for verifying the interleaved intermediate pair of quantum key with the first pair of quantum keys based on one or more prestored verification rules. The one or more prestored verification rules comprises. Further, the second quantum key generator subsystem 224 is configured for determining a second quantum bit error rate associated with transmission of the interleaved intermediate pair of quantum key with the first pair of quantum keys via the second quantum link 108 based on successful verification. Furthermore, the second quantum key generator subsystem 224 is configured for determining whether the interleaved intermediate pair and the first pair of quantum keys comprises at least one part of the key identical to one or more part of the first pair of quantum key. Also, the second quantum key generator subsystem 224 is configured for selecting the determined interleaved intermediate pair and the first pair of quantum keys as a best suitable interleaved key among a set of such interleaved key. Also, the second quantum key generator subsystem 224 is configured for generating the second pair of quantum keys comprising the best suitable interleaved key. The second pair of quantum keys are then transmitted to the to the target quantum node 110 by the transmitter 202 using a second quantum link 108 between the intermediate quantum node 106 and the target quantum node 110.

The authentication subsystem 226 is configured for generating first authentication key and the second authentication keys respectively and authenticating the source quantum node 102 and the target quantum node 110 using the first authentication key and the second authentication keys, respectively.

The error correction subsystem 228 is configured for correcting the error bits of the shared quantum key at both transmitter end and the receiver end.

The privacy amplification subsystem 230 is a method for reducing (and effectively eliminating) third party partial information about the source quantum node 102 and the target quantum node's 110 key. This partial information could have been gained both by eavesdropping on the quantum channel 104, 108 during key transmission (thus introducing detectable errors), and on the public channel 112 during information reconciliation (where it is assumed that the third-party node gains all possible parity information). The privacy amplification subsystem 230 uses the source quantum node 102 and the target quantum node's key to produce a new, shorter key, in such a way that the third-party node (not shown) has only negligible information about the new key. This can be done using a universal hash function, chosen at random from a publicly known set of such functions, which takes as its input a binary string of length equal to the key and outputs a binary string of a chosen shorter length. The amount by which this new key is shortened is calculated, based on how much information the third-party node could have gained about the old key (which is known due to the errors this would introduce), in order to reduce the probability of the third-party node having any knowledge of the new key to a very low value.

The key reconciliation subsystem 232 is configured for

The post processing subsystem 234 is configured for

The receiver 206 comprises a decoder 216 and a single photon detector 218. The receiver 206 is configured to receive the first pair of quantum keys from the source quantum node 102, and the timestamp data from the target quantum node 110. In an embodiment, the single photon detectors 218 are used to detect the photons generated at the transmitter 114 of the source quantum node 102. For example, the single photon detector 218 detects the events (such as 'clicks'). These detected events are transmitted to the target quantum node 110 accordingly. The detectors may be of various types of single-photon counters. The decoder 216 is configured for decoding the quantum signal transmitted by the source quantum node 102 using any known standard decoding algorithms.

The interface 210 is configured for enabling communication between various components of the intermediate quantum node 106 and enabling communication with the source quantum node 102 and the target quantum node 110.

FIG. 3 is a flow diagram illustrating an exemplary method 300 for securely distributing quantum keys in accordance with an embodiment of the present disclosure. In FIG. 3, the method steps performed by source quantum node 102, intermediate quantum node 106 and the target quantum node 110 is described. At step 302, a request for generating pair of quantum keys between the source quantum node 106 and a target quantum node 110 in a network 100 is received by the source quantum node 102. The source quantum node 102 and the target quantum node 110 is connected via one or more intermediate quantum nodes 106. At step 304, a first pair of quantum keys distributable between the source quantum node 102 and the intermediate quantum node 106 is generated by the source quantum node 102 based on the request. At step 306, the generated first pair of quantum keys is transmitted to the intermediate quantum node 106 by the source quantum node 102 using a first quantum link 104. At step 308, an intermediate pair of quantum key distributable between the intermediate quantum node 106 and the target quantum node 110 is generated by the intermediate quantum node 106 based on one or more events detected at the intermediate quantum node 106. At step 310, the generated intermediate pair of quantum key is interleaved with the first pair of quantum keys at appropriate time locations by the intermediate quantum node 106. At step 312, a second pair of quantum keys comprising the interleaved intermediate pair of quantum key and the first pair of quantum keys is generated by the intermediate quantum node 106. A part of the generated second pair of quantum keys distributable between the intermediate quantum node 106 and the target quantum node 110 is identical to a part of the first pair of quantum keys distributed between the source quantum node 102 and the intermediate quantum node 106. At step 312, the generated second pair of quantum keys is encoded and transmitted to the target quantum node 110 by the intermediate quantum node 106 using a second quantum link 108. Each node in the network 100 comprises at least one apparatus capable of transmitting and/or receiving a quantum signal via the quantum link. The source quantum node 102 and the target quantum node 110 are not directly connected via a single quantum link.

At step 316, the generated second pair of quantum keys is received from the intermediate quantum node 106 by the target quantum node 110. Further, the target quantum node 110 is configured for sending an acknowledgement message on receipt of the second pair of quantum keys to the source quantum node via an internet and to the intermediate quantum node via the second quantum link.

In an aspect of the embodiment, in generating the first pair of quantum keys distributable between the source quantum node 102 and the intermediate quantum node 106 based on the request, the method 300 includes determining a key transmission path from the source quantum node 102 to the target quantum node 110 based on one or more parameters. The key transmission path comprising the source quantum node 102 as the start node, the target quantum node 110 as the destination node and one or more intermediate quantum nodes 106 connected to the source quantum node 102 and the target quantum node 110 via one or more quantum links 104 and 108, respectively. Further, the method 300 includes authenticating the one or more intermediate quantum nodes 106 and the target quantum node 110 comprised in the determined key transmission path using a first authentication key. Also, the method 300 includes generating the first pair of quantum keys distributable between the source quantum node 102 and the intermediate quantum node 106 based on successful authentication.

In another aspect of the embodiment, in generating the intermediate pair of quantum key distributable between the intermediate quantum node 106 and the target quantum node 110 based on one or more events detected at the intermediate quantum node 106, the method 300 includes authenticating the target quantum node using a second authentication key upon detecting one or more events at the intermediate quantum node 106. Further, the method 300 includes determining a first quantum bit error rate associated with transmission of the intermediate pair of quantum key via the second quantum link 108 upon successful authentication of the target quantum node 110. Further, the method includes generating the intermediate pair of quantum key distributable between the intermediate quantum node 106 and the target quantum node 110 based on the determined quantum bit error rate.

In yet another aspect of the embodiment, in interleaving the generated intermediate pair of quantum key with the first pair of quantum keys at appropriate time locations, the method 300 includes determining quantum states of the intermediate pair of quantum key and the first pair of quantum key by parsing the intermediate pair of quantum key and the first pair of quantum keys. Further, the method 300 includes determining time locations in a string of quantum signal for each of the intermediate pair of quantum key and the first pair of quantum key. Also, the method 300 includes interleaving randomly, the generated intermediate pair of quantum key and the first pair of quantum keys at determined time locations based on the determined quantum states.

In still another aspect of the embodiment, in generating the second pair of quantum keys comprising the interleaved intermediate pair of quantum key and the first pair of quantum keys, the method 300 includes verifying the interleaved intermediate pair of quantum key with the first pair of quantum keys based on one or more prestored verification rules. Further, the method 300 includes determining a second quantum bit error rate associated with transmission of the interleaved intermediate pair of quantum key with the first pair of quantum keys via the second quantum link based on successful verification. Also, the method 300 includes determining whether the interleaved intermediate pair and the first pair of quantum keys comprises at least one part of the key identical to one or more part of the first pair of quantum key. Also, the method 300 includes selecting the determined interleaved intermediate pair and the first pair of quantum keys as a best suitable interleaved key among a set of such interleaved key. Further, the method 300 includes generating the second pair of quantum keys comprising the best suitable interleaved key.

Various embodiments of the present system provide a technical solution to the problem of distributing an identical shared key between two nodes which are not directly connected via a quantum channel using a quantum link rather than a conventional IP link. The present system avoids the problem of point-to-point topology of generating quantum safe symmetric keys. The present invention allows for feeding through in true quantum sense information from source quantum node to target quantum node through intermediate quantum node. The source quantum node and the target quantum node need not be directly connected through a fibre. The distance between the source quantum node and the intermediate quantum node which provides quantum safe symmetric key is not limited by the QKD scheme such as BB84, DPS, COW and the like. The QKD scheme implemented between the source quantum node and the intermediate quantum node, and between the intermediate quantum node and the target quantum node need not be the same. The decision of the QKD scheme between any pair of nodes depends on the local constraints. The present invention can be applied for more than three nodes as well based on the key rate requirement.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk.

Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for distributing quantum keys on an quantum device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

The invention claimed is:

1. A quantum key distribution system for securely distributing quantum keys in a network, the system comprising:
   a source quantum node comprising:
      a receiver configured for receiving a request for generating pair of quantum keys between the source quantum node and a target quantum node in a network, wherein the source quantum node and the target quantum node is connected via one or more intermediate quantum nodes;
      a source quantum key generator subsystem for generating a first pair of quantum keys distributable between the source quantum node and the intermediate quantum node based on the request; and
      a transmitter configured for transmitting the generated first pair of quantum keys to the intermediate quantum node using a first quantum link between the source quantum node and the intermediate quantum node; and
   the intermediate quantum node comprising:
      an intermediate quantum key generator subsystem configured for generating an intermediate pair of quantum key distributable between the intermediate quantum node and the target quantum node based on one or more events detected at the intermediate quantum node;
      an interleave subsystem configured for interleaving the generated intermediate pair of quantum key with the first pair of quantum keys at appropriate time locations;
      a second quantum key generator subsystem configured for generating a second pair of quantum keys comprising the interleaved intermediate pair of quantum key and the first pair of quantum keys, wherein a part of the generated second pair of quantum keys distributable between the intermediate quantum node and the target quantum node is identical to a part of the first pair of quantum keys distributed between the source quantum node and the intermediate quantum node; and an encoding subsystem and a transmitter configured for encoding and transmitting the generated second pair of quantum keys to the target quantum node using a second quantum link between the intermediate quantum node and the target quantum node.

2. The system of claim 1, wherein each node in the network comprises at least one apparatus capable of transmitting and/or receiving a quantum signal via the quantum link.

3. The system of claim 1, wherein the source quantum node and target quantum node are not directly connected via a single quantum link.

4. The system of claim 1, wherein the target quantum node comprises a transmitter configured for:
sending an acknowledgement message on receipt of the second pair of quantum keys to the source quantum node via an internet and to the intermediate quantum node via the second quantum link.

5. The system of claim 1, wherein in generating the first pair of quantum keys distributable between the source quantum node and the intermediate quantum node based on the request, the source quantum key generator subsystem is configured for:
determining a key transmission path from the source quantum node to the target quantum node based on one or more parameters, wherein the key transmission path comprising the source quantum node as the start node, the target quantum node as the destination node and one or more intermediate quantum nodes connected to the source quantum node and the target quantum node via one or more quantum links;
authenticating the one or more intermediate quantum nodes and the target quantum node comprised in the determined key transmission path using a first authentication key; and
generating the first pair of quantum keys distributable between the source quantum node and the intermediate quantum node based on successful authentication.

6. The system of claim 1, wherein in generating the intermediate pair of quantum key distributable between the intermediate quantum node and the target quantum node based on one or more events detected at the intermediate quantum node, the intermediate quantum key generator subsystem is configured for:
authenticating the target quantum node using a second authentication key upon detecting one or more events at the intermediate quantum node;
determining a first quantum bit error rate associated with transmission of the intermediate pair of quantum key via the second quantum link upon successful authentication of the target quantum node; and
generating the intermediate pair of quantum key distributable between the intermediate quantum node and the target quantum node based on the determined quantum bit error rate.

7. The system of claim 1, wherein in interleaving the generated intermediate pair of quantum key with the first pair of quantum keys at appropriate time locations, the interleave subsystem is configured for:

determining quantum states of the intermediate pair of quantum key and the first pair of quantum key by parsing the intermediate pair of quantum key and the first pair of quantum keys; and
determining time locations in a string of quantum signal for each of the intermediate pair of quantum key and the first pair of quantum key; and
interleaving randomly, the generated intermediate pair of quantum key and the first pair of quantum keys at determined time locations based on the determined quantum states.

8. The system of claim 1, wherein in generating the second pair of quantum keys comprising the interleaved intermediate pair of quantum key and the first pair of quantum keys, the second quantum key generator subsystem is configured for:
verifying the interleaved intermediate pair of quantum key with the first pair of quantum keys based on one or more prestored verification rules;
determining a second quantum bit error rate associated with transmission of the interleaved intermediate pair of quantum key with the first pair of quantum keys via the second quantum link based on successful verification;
determining whether the interleaved intermediate pair and the first pair of quantum keys comprises at least one part of the key identical to one or more part of the first pair of quantum key;
selecting the determined interleaved intermediate pair and the first pair of quantum keys as a best suitable interleaved key among a set of such interleaved key; and
generating the second pair of quantum keys comprising the best suitable interleaved key.

9. A method for securely distributing quantum keys in a network, the method comprising:
receiving, by a source quantum node, a request for generating shared pair of quantum keys between the source quantum node and a target quantum node in a network, wherein the source quantum node and the target quantum node is connected via one or more intermediate quantum nodes;
generating, by the source quantum node, a first pair of quantum keys distributable between the source quantum node and the intermediate quantum node based on the request;
transmitting, by the source quantum node, the generated first pair of quantum keys to the intermediate quantum node using a first quantum link between the source quantum node and the intermediate quantum node;
generating, by the intermediate quantum node, an intermediate pair of quantum key distributable between the intermediate quantum node and the target quantum node based on one or more events detected at the intermediate quantum node;
interleaving, by the intermediate quantum node, the generated intermediate pair of quantum key with the first pair of quantum keys at appropriate time locations;
generating, by the intermediate quantum node, a second pair of quantum keys comprising the interleaved intermediate pair of quantum key and the first pair of quantum keys, wherein a part of the generated second pair of quantum keys distributable between the intermediate quantum node and the target quantum node is identical to a part of the first pair of quantum keys distributed between the source quantum node and the intermediate quantum node; and encoding and transmitting, by the intermediate quantum node, the generated second pair of quantum keys to the target quantum node using a second quantum link between the intermediate quantum node and the target quantum node.

10. The method of claim 9, wherein each node in the network comprises at least one apparatus capable of transmitting and/or receiving a quantum signal via the quantum link.

11. The method of claim 9, wherein the source quantum node and target quantum node are not directly connected via a single quantum link.

12. The method of claim 9, further comprising:
sending, by the target quantum node, an acknowledgement message on receipt of the second pair of quantum keys to the source quantum node via an internet and to the intermediate quantum node via the second quantum link.

13. The method of claim 9, wherein generating the first pair of quantum keys distributable between the source quantum node and the intermediate quantum node based on the request comprises:
determining a key transmission path from the source quantum node to the target quantum node based on one or more parameters, wherein the key transmission path comprising the source quantum node as the start node, the target quantum node as the destination node and one or more intermediate quantum nodes connected to the source quantum node and the target quantum node via one or more quantum links;
authenticating the one or more intermediate quantum nodes and the target quantum node comprised in the determined key transmission path using a first authentication key; and
generating the first pair of quantum keys distributable between the source quantum node and the intermediate quantum node based on successful authentication.

14. The method of claim 9, wherein generating the intermediate pair of quantum key distributable between the intermediate quantum node and the target quantum node based on one or more events detected at the intermediate quantum node comprises:
authenticating the target quantum node using a second authentication key upon detecting one or more events at the intermediate quantum node;
determining a first quantum bit error rate associated with transmission of the intermediate pair of quantum key via the second quantum link upon successful authentication of the target quantum node; and
generating the intermediate pair of quantum key distributable between the intermediate quantum node and the target quantum node based on the determined quantum bit error rate.

15. The method of claim 9, wherein interleaving the generated intermediate pair of quantum key with the first pair of quantum keys at appropriate time locations comprises:
determining quantum states of the intermediate pair of quantum key and the first pair of quantum key by parsing the intermediate pair of quantum key and the first pair of quantum keys; and
determining time locations in a string of quantum signal for each of the intermediate pair of quantum key and the first pair of quantum key; and interleaving randomly, the generated intermediate pair of quantum key and the first pair of quantum keys at determined time locations based on the determined quantum states.

16. The method of claim 9, wherein generating the second pair of quantum keys comprising the interleaved intermediate pair of quantum key and the first pair of quantum keys comprises:
verifying the interleaved intermediate pair of quantum key with the first pair of quantum keys based on one or more prestored verification rules;
determining a second quantum bit error rate associated with transmission of the interleaved intermediate pair of quantum key with the first pair of quantum keys via the second quantum link based on successful verification;
determining whether the interleaved intermediate pair and the first pair of quantum keys comprises at least one part of the key identical to one or more part of the first pair of quantum key;
selecting the determined interleaved intermediate pair and the first pair of quantum keys as a best suitable interleaved key among a set of such interleaved key; and
generating the second pair of quantum keys comprising the best suitable interleaved key.

17. A non-transitory computer-readable storage medium having instructions stored therein that when executed by a hardware processor, cause the processor to perform method steps comprising:
receiving a request for generating shared pair of quantum keys between the source quantum node and a target quantum node in a network, wherein the source quantum node and the target quantum node is connected via one or more intermediate quantum nodes;
generating a first pair of quantum keys distributable between the source quantum node and the intermediate quantum node based on the request;
transmitting the generated first pair of quantum keys to the intermediate quantum node using a first quantum link between the source quantum node and the intermediate quantum node;
generating an intermediate pair of quantum key distributable between the intermediate quantum node and the target quantum node based on one or more events detected at the intermediate quantum node;
interleaving the generated intermediate pair of quantum key with the first pair of quantum keys at appropriate time locations;
generating a second pair of quantum keys comprising the interleaved intermediate pair of quantum key and the first pair of quantum keys, wherein a part of the generated second pair of quantum keys distributable between the intermediate quantum node and the target quantum node is identical to a part of the first pair of quantum keys distributed between the source quantum node and the intermediate quantum node; and
encoding and transmitting the generated second pair of quantum keys to the target quantum node using a second quantum link between the intermediate quantum node and the target quantum node.

18. The non-transitory computer-readable storage medium of claim 17, further cause the processor to perform method steps comprising:
sending, by the target quantum node, an acknowledgement message on receipt of the second pair of quantum keys to the source quantum node via an internet and to the intermediate quantum node via the second quantum link.

* * * * *